United States Patent Office 3,235,545
Patented Feb. 15, 1966

3,235,545
6β,19-OXIDO-16,17-ACETALS AND KETALS OF THE PREGNANE SERIES AND INTERMEDIATES THEREFOR
Patrick A. Diassi, Westfield, N.J., assignor to Olin Mathieson Chemical Corporation, New York, N.Y., a corporation of Virginia
No Drawing.  Filed May 25, 1964, Ser. No. 370,122
9 Claims.  (Cl. 260—239.55)

This invention relates to and has as its object the provision of novel physiologically active steroids, processes for their production and new intermediates useful in the preparation thereof.

More particularly, this invention relates to the provision of steroids of the formula

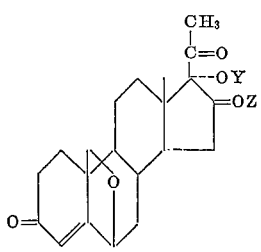

wherein Y is hydrogen; Z is hydrogen and together Y and Z is

wherein P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The compounds of this invention are physiologically active substances which possess progestational activity when administered both in the form of tablets and as a solution or suspension and hence can be used in lieu of known progestational agents such as progesterone in the treatment of habitual abortion, for which purpose they can be administered in the same manner as progesterone, for example, the dosage being adjusted for the relative potency of the particular steroid.

The compounds of the instant invention may be prepared by the process of the invention as illustrated by the following equations wherein P and Q are as hereinbefore defined and R, R' and R" may be hydrogen, alkyl or acyl; and X is halogen:

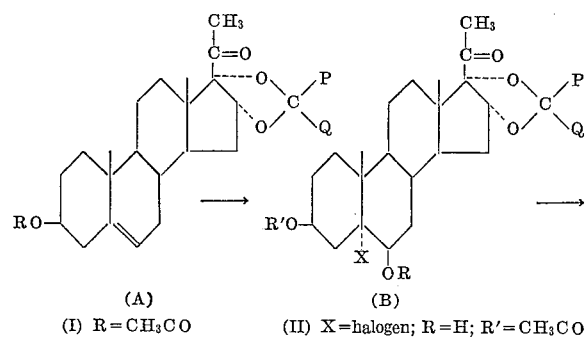

(A)
(I) R=CH₃CO (B)
(II) X=halogen; R=H; R'=CH₃CO

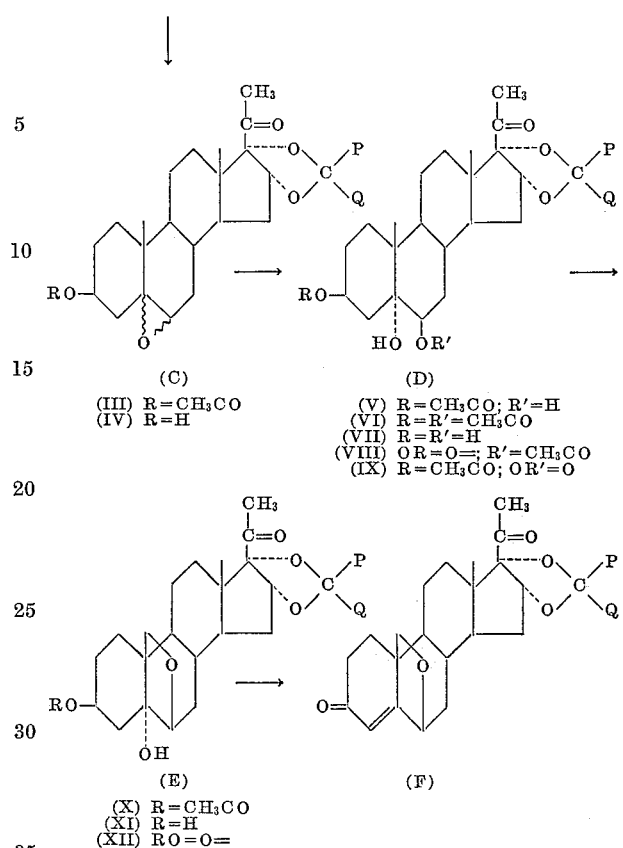

(C)
(III) R=CH₃CO
(IV) R=H (D)
(V) R=CH₃CO; R'=H
(VI) R=R'=CH₃CO
(VII) R=R'=H
(VIII) OR=O=; R'=CH₃CO
(IX) R=CH₃CO; OR'=O (E)
(X) R=CH₃CO
(XI) R=H
(XII) RO=O=

(F)

In the first step of the process of this invention, the 16,17-acetal and ketal derivatives of 3-acyloxy-Δ⁵-pregnene-16,17-diol (Compounds A) are treated with a haloacetamide, for example, N-bromoacetamide to yield the 5-halo-6-hydroxy derivatives thereof (Compounds B). The Compound A starting materials may be prepared according to the process set forth in co-pending application, Serial No. 264,688, filed March 12, 1963 in the name of Patrick Andrew Diassi.

The 5-halo-6-hydroxy derivatives (Compounds B) are then dehydrohalogenated as by treatment with potassium carbonate to yield the 5,6-epoxy derivatives (Compounds C) which are new compounds of this invention. When in the formulae set forth in this application and the appended claims, a curved line (ʃ) is employed in the linkage of atoms, it is meant to denote that the connected atom may be either in the alpha or beta position, as is determined in the respective compounds involved.

The 5,6-epoxy derivatives (Compounds C) may then be treated with an acid, for example, perchloric acid to yield the 5,6-dioxygenated derivatives (Compounds D) which are also new compounds of this invention.

Compounds D may then be oxidized as by treatment with lead tetraacetate to yield the 6,19-oxido derivatives of this invention (Compounds E) which are also new products of this invention.

Compounds E may then be oxidized and treated with a hydrogen halide, for example, hydrogen chloride in an acid medium, for example, acetic acid, to yield the 6β,19-oxidoprogesterone derivatives (Compounds G).

The acyl radicals preferred in the practice of this invention are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acids), the cycloalkane carboxylic acids and the cycloalkene carboxylic acids.

This invention may be further illustrated by the following examples:

EXAMPLE 1

*5α-bromo-16α,17α-dimethylmethylenedioxypregnane-3β-6β-diol-20-one 3-acetate*

To a solution of 355 grams of 16α,17α-dimethylmethylenedioxy-Δ⁵-pregnene-3β-ol-20-one 3-acetate in 16.6 liters of dioxane bromoacetamide are added and the resulting solution kept in the dark at room temperature for two hours during which time it turns amber in color. A 5% solution of sodium sulfite is then added until the solution turns colorless. It is then diluted with 19 liters of water and extracted with chloroform. The chloroform extracts are washed with water and evaporated to dryness in vacuo. Crystallization of the residue from acetone-hexane gives 172 grams of 5α-bromo-16α,17α-dimethylmethylenedioxypregnane-3β,6β-diol-20-one 3-acetate having a melting point of about 158–160°.

Similarly, following the procedure of Example 1, but substituting other haloacetamides for N-bromoacetamide, for example N-chloroacetamide there is obtained the respective 5α-halo derivative, for example, 5α-chloro derivative.

EXAMPLE 2

*5α,6α-oxido-16α,17α-dimethylmethylenedioxypregnane-3β-ol-20-one 3-acetate*

The procedure of Example 1 is followed and the mother liquors of the crystallization are evaporated to dryness and the residue dissolved in 6 liters of chloroform hexane (1:1, v.:v.). This solution is adsorbed on to 6 kilograms of Woelm neutral alumina (Activity I). Elution with chloroform, evaporation of the eluates in vacuo, and crystallization of the residue obtained therefrom gives 5α,6α-oxido-16α,17α-dimethylmethylenedioxypregnane-3β-ol-20-one 3-acetate having a melting point about 200–202° C., $[\alpha]_D^{22}$ −12° (chloroform).

*Anal.*—Calc'd for $C_{26}H_{38}O_6$ (446.56): C, 69.93; H, 8.58. Found: C, 69.94; H, 8.53.

EXAMPLE 3

*16α,17α-dimethylmethylenediovypregnane-3β,5α,6β-triol-20-one 3-acetate*

Following the procedure of Example 2, and further eluting the alumina with ethyl acetate and crystallization of the residue yields 3.2 grams of 16α,17α-dimethylmethylenedioxypregnane-3β,5α,6β-rtiol-20-one 3-acetate having a melting point 283–285° C., $[\alpha]_D^{22}$ +11° (chloroform).

*Anal.*—Calc'd. for $C_{26}H_{40}O_7$ (464.58): C. 67.21; H, 8.68. Found: C, 67.34; H, 8.77.

EXAMPLE 4

*5α,6α-oxido-16α,17α-dimethylmethylenedioxypregnane-3β-ol-20-one*

To a solution of 500 ml. of 5α,6α-oxide-16α,17α-dimethylmethylenedioxypregnane-3β-ol-20-one 3-acetate in 25 mil. of methanol is added 5 ml. of 10% potassium carbonate and the solution stirred at room temperature for twenty minutes. It is then neutralized with 10% acetic acid and diluted with water whereupon, crystallization occurs. The crystals are filtered, washed with water, and dried to give 350 mg. of 5α,6α-oxido-16α,17α-dimethylmethylenedioxypregnane-3β-ol-20-one, $[\alpha]_D^{24}$ −16° (chloroform).

*Anal.*—Calc'd. for $C_{24}H_{36}O_5$ (404.55): C, 71.25; H, 8.97. Found: C, 71.17; H, 9.13.

EXAMPLE 5

*16α,17α-dimethylmethylenedioxypregnane-3β,5α,6β-triol-20-one*

To a solution of 200 mg. of 16α,17α-dimethylmethylenedioxypregnane-3β,5α,6β-triol-20-one 3-acetate in 8 ml. of methanol, there is added 2.0 ml. of 1% potassium carbonate and the solution stirred at room temperature for four hours. It is then neutralized with 10% acetic acid, diluted with water and extracted with chloroform. The chloroform is separated, evaporated to dryness in vacuo and the residue crystallized from acetone-hexane to give 106 mg. of 16α,17α-dimethylmethylenedioxypregnane-3β,5α,6β-triol-20-one having a melting point of 231–233° C., $[\alpha]_D^{22}$ +34° (chloroform).

*Anal.*—Calc'd. for $C_{24}H_{38}O_6$ (422.57): C, 68.22; H, 9.07. Found: C, 68.37; H, 8.96.

EXAMPLE 6

*16α,17α-dimethylmethylenedioxypregnane-3β,5α,6β-triol-20-one 3,6-diacetate*

A solution of 200 mg. of 16α,17α-dimethylmethylenedioxypregnane 3β,5α,6β-triol-20-one 3-acetate in 3 ml. of anhydrous pyridine and one ml. of acetic anhydride is kept at room temperature for fifty-four hours. The acetic anhydride is decomposed by slow addition of ice and the mixture distributed between chloroform and water. The chloroform is washed with 2 N hydrochloric acid then with water until neutral and the chloroform evaporated to dryness in vacuo. Crystallization of the residue from acetone-hexane gives 160 mg. of 16α,17α-dimethylenedioxypregnane-3β,5α,6β-triol-20-one 3,6-diacetate having a melting point of about 236–238° C., $[\alpha]_D^{22}$ +90° (chloroform).

*Anal.*—Calc'd. for $C_{28}H_{42}O_8$ (506.62): C, 66.38; H, 8.36. Found: C, 66.46; H, 8.37.

EXAMPLE 7

*16α,17α-dimethylmethylenedioxypregnane-3β,5α-diol-6,20-dione 3-acetate*

To a solution of 100 mg. of 16α,17α-dimethylmethylenedioxypregnane-3β,5α,6β-triol-20-one 3-acetate in 5 ml. of reagent grade acetone is added dropwise an aqueous solution containing 20 mg. of chromic anhydride and 32 mg. of sulfuric acid per ml. until it is no longer decolorized. After stirring for ten minutes the excess chromic anhydride is decomposed by methanol and the solution diluted slowly with water. The crystals which separate are filtered, washed with water, and dried to give 70 mg. of 16α,17α-dimethylmethylenedioxypregnane-3β,5α-diol-6,20-dione 3-acetate having melting point 273–275°, $[\alpha]_D^{22}$ +4.0° (chloroform).

*Anal.*—Calc'd. for $C_{26}H_{38}O_7$ (466.57): C, 67.51; H, 8.28. Found: C, 67.53; H, 8.29.

EXAMPLE 8

*5β,6β-oxido-16α,17α-dimethylmethylenedioxypregnane-3β-ol-20-one*

A solution of 450 mg. of 5α-bromo-16α,17α-dimethylmethylenedioxypregnane-3β,6β-diol-20-one 3-acetate in 25 ml. of methanol is treated with 5 ml. of 10% potassium carbonate and stirred at room temperature for twenty minutes. It is then neutralized with 10% acetic acid, diluted with water and extracted with chloroform. The chloroform is washed with water and evaporated to dryness in vacuo. Crystallization of the residue from acetone-hexane gives 250 mg. of 5β,6β-oxido-16α,17α-dimethylmethylenedioxypregnane-3β-ol-20-one having a melting point of about 205–207° C., $[\alpha]_D^{24}$ +37° (chloroform).

*Anal.*—Calc'd. for $C_{24}H_{36}O_5$ (404.55): C, 71.25; H, 8.97. Found: C, 70.76; H, 9.00.

EXAMPLE 9

*5β,6β-oxido-16α,17α-dimethylmethylenedioxypregnane-3β-ol-20-one 3-acetate*

A solution of 100 mg. of 5β,6β-oxido-16α,17α-dimethylmthylenedioxypregnane-3β-ol-20-one in 3 ml. of anhydrous pyridine and 1 ml. of acetic anhydride is left at room temperature for sixteen hours and then slowly diluted with ice water. The crystals which separate are filtered, washed with water, and dried to give 99 mg. of 5β,6β - oxido - 16α,17α - dimethylmethylenedioxypregnane-3β-ol-20-one 3-acetate having a melting point of 133–135° C., [α]$_D^{24}$ +26° (chloroform).

Anal.—Calc'd. for $C_{26}H_{38}O_6$ (446.59): C, 69.93; H, 8.58. Found: C, 69.27; H, 8.59.

EXAMPLE 10

*6β,19-oxido-16α,17α-dimethylmethylenedioxypregnane-3β,5α-diol-20-one 3-acetate*

A suspension of 8.9 g. of lead tetraacetate which has been dried under high vacuum over potassium hydroxide, and 2.9 g. of calcium carbonate which has been dried over phosphorus pentoxide, in 110 ml. of cyclohexane is stirred under reflux for ten minutes. A solution of 2.0 gram of 16α,17α-dimethylmethylenedioxypregnane-3β,5α,6β-triol-20-one in 315 ml. of benzene is then added followed by 2.54 g. of iodine and the mixture is stirred under reflux with irradiation from a 250 watt lamp for four hours, during which time the iodine color disappears. The reaction mixture is then filtered, washed with 300 ml. portions of methylene chloride and ethyl acetate, respectively. The combined filtrate is then washed successively with 500 ml. of 5% potassium iodide, 10% sodium sulfite and water, dried over magnesium sulfate and evaporated to dryness, in vacuo. Crystallization of the residue gives 6β,19 - oxido - 16α,17α - dimethylmethylenedioxypregnane-3β,5α-diol-20-one 3-acetate.

EXAMPLE 11

*6β,19-oxido-16α,17α-dimethylmethylenedioxypregnane-3β,5α-diol-20-one*

To a solution of 500 mg. of 6β,19-oxido-16α,17α-dimethylmethylenedioxypregnane - 3β,5α - diol - 20 - one 3-acetate in 25 ml. of methanol 5 ml. of 10% potassium carbonate is added and the mixture stirred at room temperature for one hour. It is then neutralized with 10% acetic acid, diluted with water, and extracted with chloroform. The chloroform extract is washed with water and evaporated to dryness in vacuo. Crystallization of the residue gives 6β,19-oxido-16α,17α-dimethylmethylenedioxypregnane-3β,5α-diol-20-one.

EXAMPLE 12

*6β,19-oxido-16α,17α-dimethylmethylenedioxypregnane-5α-ol-3,20-dione*

To a solution of 200 mg. of 6β,19-oxido-16α,17α-dimethylmethylenedioxypregnane-3β,5α-diol-20-one in 15 ml. of reagent grade acetone an aqueous solution containing 20 mg. of chromic anhydride and 32 mg. of sulfuric acid per ml. of solution is added dropwise until the oxidizing reagent is no longer decolorized. After ten minutes the excess oxidizing agent decomposed with methanol and the solution carefully diluted with water. The crystals which separate are filtered, washed with water, and dried to give 6β,19-oxido-16α,17α-dimethylmethylenedioxypregnane-5α-ol-3,20-dione.

EXAMPLE 13

*6β,19-oxido-16α,17α-dimethylmethylenedioxyprogesterone*

To a solution of 15 mg. of 6β,19-oxido-16α,17α-dimethylmethyenedioxypregnane-5α-ol-3,20-dione in 5 ml. of acetic acid a slow stream of dry hydrogen chloride is passed for two minutes. After eighteen hours at room temperature, dilute sodium bicarbonate is added and the mixture extracted with ethyl acetate. The ethyl acetate is washed with water, dried over sodium sulfate and evaporated in dryness. Purification of the residue by chromatography on alumina gives 6β,19-oxido-16α,17α-dimethylmethylenedioxyprogesterone having a melting point of about 213–214° C., [α]$_D^{22}$ —42° (chloroform).

Similarly, if the procedures of Example 1 to 15 are carried out but other 16,17-acetal and ketal derivatives are employed as starting materials, the respective 16,17-acetal and ketal final products are obtained.

EXAMPLE 14

*16α,17α-dimethylmethylenedioxypregnane-3β,5α,6β-triol-20-one*

A solution of 200 mg. of 5α,6α-oxido-16α,17α-dimethylmethylenedioxypregnane - 3β-ol - 20 - one 3-acetate in a mixture of 6.5 ml. of dioxane and 1.75 ml. of 2 molar perchloric acid is stirred at room temperature for 48 hours. The solution is then diluted with water and extracted with chloroform. The chloroform phase is washed with water until neutral and then evaporated to dryness, in vacuo. Crystallization of the residue from acetone-hexane gives 16α,17α - dimethylmethylenedioxypregnane-3β,5α,6β-triol-20-one.

The invention may be variously otherwise embodied within the scope of the appended claims.

What is claimed is:

1. A compound of the formula

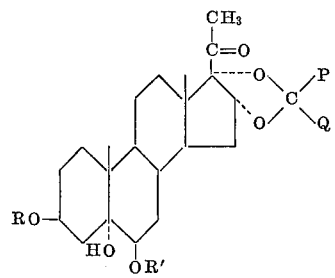

wherein R is selected from the group consisting of hydrogen and the acyl radical of a hydrocarbon carboxylic acid of less than twelve carbon atoms; R' is selected from the group consisting of hydrogen, the acyl radical of a hydrocarbon carboxylic acid of less than twelve carbon atoms and together OR' are oxo; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic aryl, monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

2. A compound of the formula

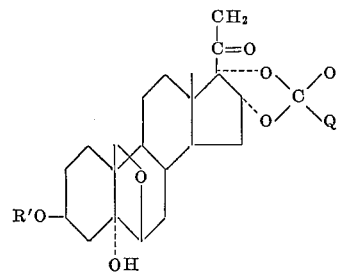

wherein R' is selected from the group consisting of hydrogen, the acyl radical of a hydrocarbon carboxylic acid of less than twelve carbon atoms and together OR' are oxo; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

3. $16\alpha,17\alpha$ - dimethylmethylenedioxypregnane - $3\beta,5\alpha,6\beta$-triol-20-one 3-acetate.

4. $16\alpha,17\alpha$ - dimethylmethylenedioxypregnane - $3\beta,5\alpha,6\beta$-triol-20-one.

5. $16\alpha,17\alpha$ - dimethylmethylenedioxypregnane - $3\beta,5\alpha,6\beta$-triol-20-one 3,6-diacetate.

6. $16\alpha,17\alpha$ - dimethylmethylenedioxypregnane - $3\beta,5\alpha,$ diol-6, 20-dione 3-acetate.

7. $6\beta,19$ - oxido-$16\alpha,17\alpha$-dimethylmethylenedioxypregnane-$3\beta,5\alpha$-diol-20-one 3-acetate.

8. $6\beta,19$ - oxido-$16\alpha,17\alpha$-dimethylmethylenedioxypregnane-$3\beta,5\alpha$-diol-20-one.

9. $6\beta,19$ - oxido-$16\alpha,17\alpha$-dimethylmethylenedioxypregnane-$5\alpha$-ol-3,20-dione.

References Cited by the Examiner

UNITED STATES PATENTS 3,107,240  10/1963  Ringold et al. ____ 260—239.55

LEWIS GOTTS, *Primary Examiner.*

HENRY A. FRENCH, *Assistant Examiner.*

UNITED STATES PATENT OFFICE
CERTIFICATE OF CORRECTION

Patent No. 3,235,545                                  February 15, 1966

Patrick A. Diassi

It is hereby certified that error appears in the above numbered patent requiring correction and that the said Letters Patent should read as corrected below.

Column 1, lines 15 to 25, for that portion of the formula reading "=OZ" read -- ----OZ --; column 3, line 44, for "-dimethylmethylenediovypregnane-", in italics, read -- -dimethylmethylenedioxypregnane- --, in italics; line 49, for "-rtiol-" read -- -triol- --; line 57, for "5α,6α-oxide" read -- 5α,6α-oxido --; line 59, for "25 mil." read -- 25 ml. --; column 6, line 45, for "aryl," read -- and --; lines 55 to 69, the upper right-hand portion of the formula should appear as shown below instead of as in the patent:

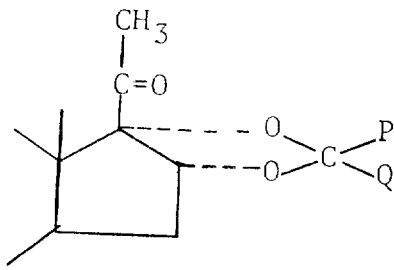

Signed and sealed this 7th day of February 1967.

(SEAL)
Attest:

ERNEST W. SWIDER
Attesting Officer

EDWARD J. BRENNER
                                             Commissioner of Patents